Nov. 29, 1955   D. A. McCAULAY ET AL   2,725,413
ETHYLTOLUENE PRODUCTION
Filed Oct. 17, 1952
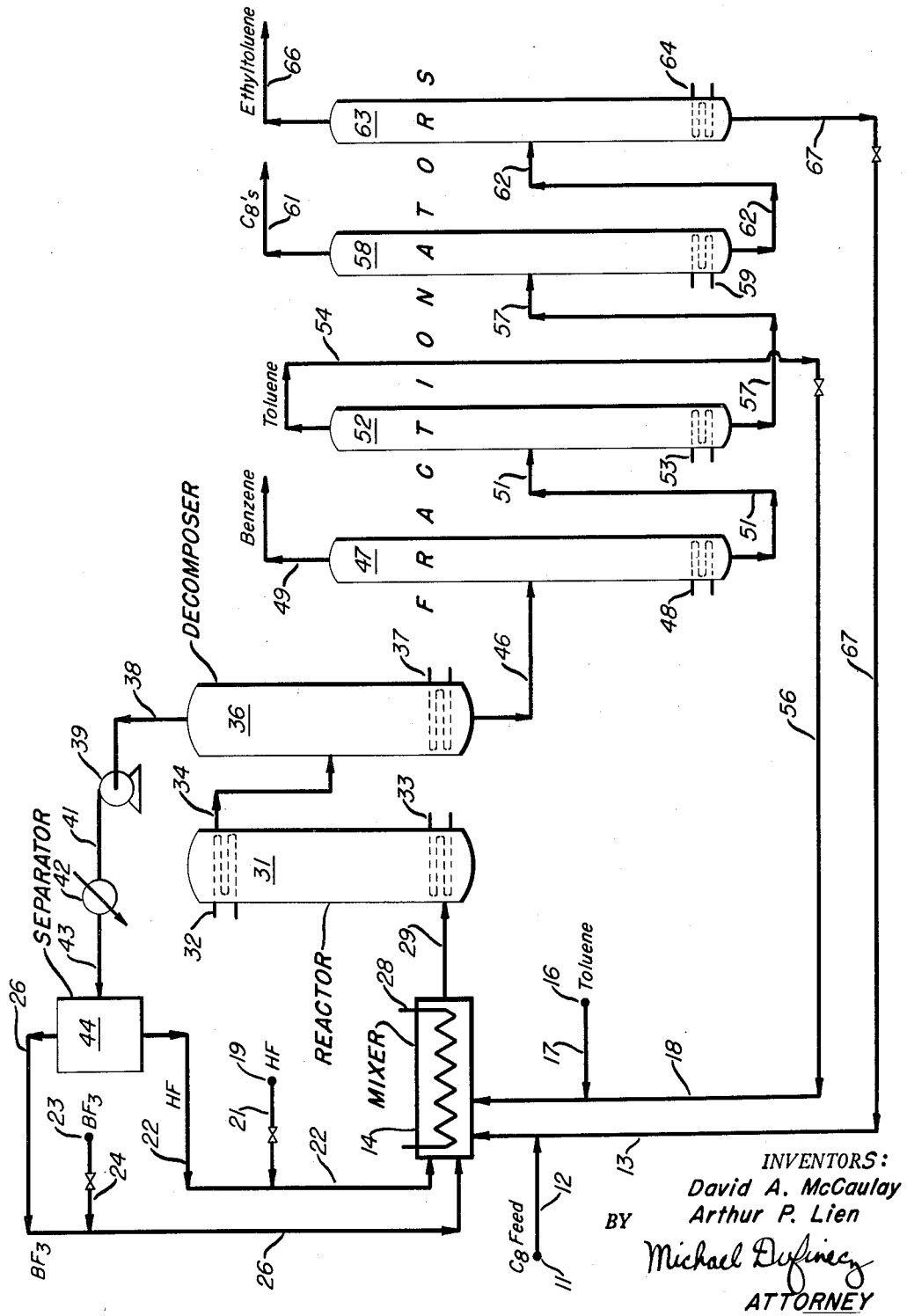
INVENTORS:
David A. McCaulay
Arthur P. Lien
BY Michael Dufinecy
ATTORNEY United States Patent Office 2,725,413
Patented Nov. 29, 1955

2,725,413

ETHYLTOLUENE PRODUCTION

David A. McCaulay, Chicago, Ill., and Arthur P. Lien, Highland, Ind., assignors to Standard Oil Company, Chicago, Ill., a corporation of Indiana Application October 17, 1952, Serial No. 315,362

10 Claims. (Cl. 260—671)

The invention relates to the preparation of a monoalkyltoluene by the interaction of a monoalkylbenzene, other than toluene, with toluene in the presence of a liquid HF solution containing an HF—$BF_3$-polymethylbenzene complex.

A considerable demand exists for thermoplastic materials such as polystyrene. In order to obtain plastics of higher softening point than that of polystyrene, alkylstyrenes are being polymerized. A valuable thermoplastic material is obtained by polymerizing vinyltoluene, i. e., methylstyrene. The source material for vinyltoluene is ethyltoluene, preferably 1,3-ethyltoluene or 1,4-ethyltoluene. The presence of 1,2-ethyltoluene in the feed to the dehydrogenation process for the production of vinyltoluene is undesirable owing to the formation of indanes, which adversely affect the softening point of the polymethylstyrene.

An object of the invention is to produce ethyltoluene, particularly essentially pure 1,3-ethyltoluene, i. e., the meta-isomer. Still another object is to treat a mixture of ethylbenzene and xylene to produce ethyltoluene and a xylene fraction low in ethylbenzene content. A particular object of the invention is to treat a close-boiling $C_8$ aromatic hydrocarbon fraction with toluene in the presence of a liquid HF—$BF_3$ treating agent to produce essentially pure 1,3-ethyltoluene and a high purity product xylene fraction.

It has been found that ethyltoluene can be prepared by interacting an ethylbenzene and toluene in a mol ratio of toluene to ethyl groups of at least 1 and in the presence of a polymethylbenzene. The reaction requires at least 1 mol of $BF_3$ per mol of said polymethylbenzene plus at least 1 mol of $BF_3$ per mol of said ethylbenzene and a sufficient amount of substantially anhydrous liquid HF to form an acid (extract) phase. The interaction is carried out at a temperature below about 125° F. for a time sufficient to produce an appreciable amount of monoethyltoluene. The mixture of hydrocarbons which contains the product monoethyltoluene is recovered by removing the HF and $BF_3$. The amount of polymethylbenzene present in the reaction zone must be sufficient to solubilize into the acid phase an amount of toluene appreciably in excess of the solubility of toluene in liquid HF.

It has been discovered that ethylbenzene and toluene readily react to form ethyltoluene and benzene when contacted with substantially anhydrous liquid HF and $BF_3$ under conditions such that the ethylbenzene and the toluene are present in the liquid HF—$BF_3$ acid phase in an amount in excess of that soluble in liquid HF alone. This increased solubility of toluene is obtained by having present in the liquid HF—$BF_3$ treating agent a polymethylbenzene in the form of an HF—$BF_3$ polymethylbenzene complex. This complex increases enormously the solubility of toluene in the acid phase over the amount soluble in liquid HF alone. At ambient temperature the liquid HF will dissolve about 1% by volume of toluene. In the absence of the polymethylbenzene complex, treatment of a mixture of ethylbenzene and toluene with liquid HF—$BF_3$ results in disproportionation of the ethylbenzene to diethylbenzene rather than in the reaction of ethylbenzene and toluene to ethyltoluene and benzene.

Although any polyalkylbenzene-$BF_3$—HF complex increases the solubility of toluene into the acid phase, it has been found that only the polymethylbenzenes are suitable for the purposes of this invention, i. e., the polymethylbenzenes reduce side reactions to a minimum. Any polymethylbenzene may be used; however, it is preferred to select a polymethylbenzene which can be readily separated from the product monoethyltoluene by distillation. In some cases it may be desirable to use a polymethylbenzene which boils very close to the boiling point of the product monoethyltoluene, but is separable therefrom by the use of HF—$BF_3$ separation techniques. When isomers of a particular polymethylbenzene are available, it is preferred to use the most basic of the configurations, i. e., the isomer that forms the most stable complex, e. g., m-xylene is the preferred xylene isomer and mesitylene is the preferred trimethylbenzene isomer. Hexamethylbenzene is of particular interest as the polymethylbenzene because of the extreme stability of its complex with HF and $BF_3$. This complex can exist per se and is stable up to temperatures of about 400° F. Thus it is possible to recover some monoethyltoluene products by distillation without decomposing the hexamethylbenzene complex; this fact in those cases permits simplification of the HF and $BF_3$ systems.

It is necessary to have present in the liquid HF—$BF_3$ treating agent a sufficient amount of polymethylbenzene to solubilize an amount of toluene appreciably in excess of the solubility of toluene in liquid HF alone. It is preferred to operate the reaction zone under conditions such that essentially all the toluene charged to the reaction zone is dissolved into the acid phase, i. e., essentially no raffinate phase exists in the reaction zone. In general the mol ratio of polymethylbenzene to toluene should be at least about 1 and may be much higher, e. g., 10. It is preferred that the polymethylbenzene/toluene ratio should be at least about 2.

The degree of conversion of monoethylbenzene is dependent upon the amount of toluene present in the reaction zone, particularly the amount of toluene dissolved in the acid phase. The mol ratio of toluene to monoethylbenzene should be at least 1. Desirably, the mol ratio should be at least about 3. Preferably, the mol ratio of toluene to monoethylbenzene should be the maximum that can be attained under the particular conditions of operation, i. e., the acid phase should be saturated with toluene at the start of the reaction.

It is preferred to operate under conditions wherein the reaction zone contains only a single substantially homogeneous liquid phase and possibly a gaseous $BF_3$ phase. It has been found that the presence of a second liquid phase (raffinate phase) of liquid HF-insoluble materials has an adverse effect on the degree of conversion and also the direction of the reaction. At very low ratios of polymethylbenzene to toluene, a raffinate phase consisting predominantly of toluene will be present in the reaction zone. In addition to the toluene, appreciable amounts of monoethylbenzene will be present in the raffinate phase; this monoethylbenzene is effectively lost to the reaction even though considerable agitation is provided in the reaction zone. The largest adverse effect results from the presence of a raffinate phase consisting predominantly of non-aromatic hydrocarbons and/or benzene. The non-aromatic hydrocarbon raffinate phase appears to overcome somewhat the solubilizing action of the complex and results in large losses of ethylbenzene and toluene to the raffinate phase and markedly decreases the yield of product. For example, the presence of about 10% of non-aromatic hydrocarbons in a feed containing about 10% of ethylbenzene and 80% of xylene results in the loss of about one-third of the ethylbenzene to the raffinate phase.

The presence of dissolved non-aromatic hydrocarbons in the acid phase does not appear to affect the reaction between toluene and the monoethylbenzene. Thus it is possible to operate under conditions to obtain maximum yields even though appreciable amounts of non-aromatic hydrocarbons such as paraffins and naphthenes are present in the acid phase.

The process of this invention must be carried out under substantially anhydrous conditions. The liquid HF used in the process should be substantially anhydrous, i. e., the liquid HF should contain less than 2 or 3% of water.

The liquid HF not only participates in the formation of the polymethylbenzene—$BF_3$—HF complex, monoethyltoluene—$BF_3$—HF complex and the di-ethylbenzene complex, but it also acts as a solvent for said complex. Therefore it is necessary to use at least enough liquid HF to participate in the formation of the complexes and also to dissolve the complexes; put in another way, it is necessary to use a sufficient amount of liquid HF to form a distinct acid (extract) phase. Desirably, at least about 2 mols of liquid HF per mol of polymethylbenzene and monoethylbenzene charged to the reaction zone should be used. More than this amount may be used, e. g., as much as 50 mols. It is preferred to use between about 6 and 15 mols of liquid HF per mol of polymethylbenzene and monoethylbenzene in the feed to the reaction zone.

Since the solubilizing effect of the polymethylbenzene is dependent upon the amount of polymethylbenzene present in the acid phase, all of the polymethylbenzene charged should be complexed. Thus at least 1 mol of $BF_3$ should be used per mol of polymethylbenzene present. As the complex exists in an equilibrium condition, some reaction of toluene and monoethylbenzene will occur even when this minimum amount of $BF_3$ is present in the reaction zone. The rate of reaction to the desired product monoethyltoluene is markedly affected by the amount of $BF_3$ present. Therefore, more than the minimum amount of $BF_3$ should be used. Desirably, the amount of $BF_3$ used should be at least 1 mol of $BF_3$ per mol of polymethylbenzene plus at least about 1 mol of $BF_3$ per mol of monoethylbenzene charged to the reaction zone. More than this amount may be used, for example, as much as 5 mols per mol of polymethylbenzene and monoethylbenzene. It is preferred to operate with between about 1.2 and 3 mols of $BF_3$ per mol of polymethylbenzene and monoethylbenzene charged.

It has been found that in addition to the amount of $BF_3$ present, the contacting (reaction) temperature and contacting (reaction) time have an important bearing on the degree of conversion and the formation of undesired reaction products; e. g., when operating with an ethylbenzene-toluene-xylene feed the undesired product is ethylxylene. It has been found that a liquid HF solution of xylene—$BF_3$—HF complex and ethyltoluene—$BF_3$—HF complex will change slowly, at ambient temperatures, to a liquid HF solution comprising xylene—$BF_3$—HF complex, ethyltoluene—$BF_3$—HF complex, ethylxylene—$BF_3$—HF complex and toluene. If the liquid HF solution is permitted to stand for a sufficient time, essentially all of the ethyltoluene will be converted into ethylxylene.

At temperatures below about 125° F. it is possible to treat a mixture of toluene, xylene and ethylbenzene with the above-described amounts of liquid HF and $BF_3$ and thereby produce a liquid HF solution containing essentially only xylene complex, ethyltoluene complex, some diethylbenzene complex and some dissolved ethylbenzene, benzene and toluene. Apparently under the conditions described above, the predominant reaction in the acid phase is the interaction of ethylbenzene and toluene to form ethyltoluene, predominantly the meta-ethyltoluene and, under some conditions of temperature and time, essentially only the meta-ethyltoluene. However, some diethylbenzene is formed and it appears that even under optimum conditions of operation about 10% of the ethylbenzene charged will not be converted to the desired ethyltoluene.

The selective formation of ethyltoluene is a very surprising result inasmuch as our previous work has indicated that under the described conditions a mixture of ethylbenzene and xylene (in the absence of toluene) produces essentially only diethylbenzene. One explanation is that the ethyltoluene complex is sufficiently more stable than the diethylbenzene complex to cause the dynamic equilibrium to proceed in the direction of the ethyltoluene rather than the diethylbenzene.

It has been found that even at temperatures below ambient, prolonged contacting times result in the formation of detectable amounts of ethylxylene; extremely long contacting times result in the formation of ethylxylene to the essentially complete exclusion of ethyltoluene. However, it has been found that at temperatures below about 125° F. a finite period of time passes before detectable amounts of ethylxylene are produced. Thus by taking advantage of this "induction period" it is possible to treat a mixture of ethylbenzene, toluene and xylene with liquid HF and $BF_3$ to produce predominantly ethyltoluene and diethylbenzene without the formation of detectable amounts of undesired ethylxylenes. The formation of ethylxylene is not desirable because (1) it reduces the yield of ethyltoluene and (2) since diethylbenzene and ethylxylene cannot be resolved by fractional distillation, the ethylxylene acts as a contaminant (or vice versa) for the diethylbenzene.

It has been found that at temperatures above 125° F. the induction period is so short that appreciable amounts of ethylxylene are formed even though the liquid HF solution of aromatic hydrocarbon complexes is quenched. It has been found that at a temperature of 125° F. the maximum contacting time for the production of ethyltoluene is on the order of 2 or 3 minutes. Slightly higher temperatures may be tolerated by reducing the contacting time and by quenching the liquid HF solution of complexes, e. g., by the addition of liquid propane. It is only necessary to reduce the temperature of the liquid HF complex solution to below 100° F. in order to increase the "induction period" to a workable time. At a contacting temperature of about 100° F. the maximum contacting time is about 10 minutes; at about 70° F. the maximum contacting time is about 30 minutes.

The temperature of contacting may be as low as 0° F. because the ethyltoluene conversion reaction is at equilibrium conditions within a few minutes even at this low temperature. The "induction period" at this low temperature is several days. When operating at temperatures of 50° F. or lower a mixture of ethyltoluene isomers is obtained at short contacting times. When it is desired to produce meta-ethyltoluene as the product, it is preferred to carry out the ethyltoluene process at a temperature between about 70° and 100° F. and to operate for times approaching the maximum, i. e., between about 10 minutes and 30 minutes wherein the longer times correspond to the lower temperatures.

It is to be understood that even at higher temperatures and longer contacting times some ethylbenzene will remain unconverted. At the preferred conditions of liquid HF and $BF_3$ usage and the preferred temperature-time relationship, about 90% of the ethylbenzene in a feed comprising essentially ethylbenzene, toluene and xylene will be converted to metaethyltoluene. The unconverted ethylbenzene will be recovered along with the xylene.

The monoethylbenzene of this invention may be a high purity material obtained by synthesis or by physical separation from admixture with other hydrocarbons. Suitable sources of such monoethylbenzenes are petroleum fractions, particularly the fractions obtained from the so-called hydroforming process or platforming process. Another source is from the light oil obtained from the carbonization of coal. Still another source is the liquid product of the hydrogenation of coal.

When the monoethylbenzene is derived from a natural source such as petroleum or coal, the aromatic hydrocarbon is normally associated with close-boiling non-aromatic hydrocarbons as well as with close-boiling organo-sulfur compounds. The non-aromatic hydrocarbons may be paraffins, naphthenes and olefins. Superfractionation of hydroformer product will at best result in a narrow-boiling cut containing, for example, about 10 to 12% of non-aromatic hydrocarbons and the remainder a mixture of $C_8$ aromatic hydrocarbons. Extractive distillation with phenol separating agent can reduce the non-aromatic hydrocarbon content of this fraction to about 2%.

The liquid $HF$—$BF_3$ treating agent is a very powerful alkylation catalyst and causes the olefins to react with the aromatic hydrocarbon and form high-boiling materials. These alkylates normally are readily separable from the product monoethyltoluene by distillation.

The organo-sulfur compounds are readily soluble in the liquid $HF$—$BF_3$ treating agent, either in physical solution or as complexes. The organo-sulfur compounds are readily removed from the product hydrocarbons by treatment with sulfuric acid or with anhydrous liquid $HF$.

Because of the demand for ethyltoluene in the production of polyvinyltoluene the mixed $C_8$ aromatic hydrocarbon fraction derivable from petroleum or from hydroformer or platformer products is of particular interest. Treatment of this $C_8$ fraction is also of interest because of the large demand for xylene containing small amounts of ethylbenzene, preferably 5% or less ethylbenzene. In order to obtain a maximum yield of xylene product, the feed to the process should comprise essentially $C_8$ aromatic hydrocarbons. In order that a single substantially homogeneous liquid phase can be maintained in the reaction zone to permit operation under these conditions, the $C_8$ aromatic hydrocarbon feed should contain less than about 2 to 3 volume percent of non-complexible, non-aromatic hydrocarbons such as paraffins and naphthenes. Olefins are not considered "non-complexible" hydrocarbons because the alkylation reaction will result in a complexible aromatic hydrocarbon; however, the percentage of olefins in the non-aromatic hydrocarbon portion of such a hydroformate is so low that an almost negligible amount of alkylate will be produced.

The non-aromatic hydrocarbons present in a mixed $C_8$ feed boil in about the same range as the $C_8$ aromatic hydrocarbons. Consequently, these non-aromatic hydrocarbons are found in the product xylene fraction. However, even when operating with a maximum of about 2 to 3 volume percent of non-aromatics in the feed, the product xylene fraction will normally contain less than about 5% of non-aromatic hydrocarbons. Such a xylene is usable in most of the operations which require high purity xylene. It has been found that the close-boiling non-aromatic content of the xylene fraction cannot be decreased by washing the complex-containing liquid HF solution with an inert hydrocarbon such as butane, pentane or hexane, which hydrocarbon has a boiling point much higher or much lower than the product fractions. The wash hydrocarbon appears to promote undesired side reactions such as the disproportionation of ethyltoluene and diethylbenzene to tri- and higher ethyl content polyethylbenzenes and di- and higher ethyl content polyethyltoluenes. Furthermore, the wash hydrocarbons appear to promote isomerization of meta-ethyltoluene and meta-diethylbenzene to the corresponding ortho and para-isomers.

It is preferred to operate the monoethyltoluene process using a feed and amounts of liquid HF and $BF_3$ such that substantially only one liquid phase is present in the contacting zone. In the contacting zone the term "single substantially homogeneous liquid phase" is to be understood as including zone conditions such that only a liquid HF solution is present or such that a barely detectable amount of raffinate phase is present along with the liquid HF solution.

In order to show the result obtainable by the ethyltoluene process, the following experimental run is described:

Run 1

The run was carried out using a carbon steel reactor provided with a 1725 R. P. M. stirrer. The order of addition was: (1) feed, (2) liquid HF and (3) $BF_3$. The contents of the reactor were brought to the desired temperature and were agitated for the desired contacting time. At the completion of the contacting time the stirring was stopped and the contents permitted to settle for about 10 minutes. The contents of the reactor were withdrawn in such a manner that two liquid phases (if two existed therein) were withdrawn into separate receivers. The liquid phase(s) was withdrawn into a copper vessel filled with crushed ice. The complexes were decomposed by the water resulting in the formation of a lower aqueous layer and an upper hydrocarbon layer. The hydrocarbon layer was washed with dilute aqueous caustic to remove HF and $BF_3$ remaining therein and were then water-washed to remove traces of the aqueous caustic.

The product hydrocarbons were fractionated in a laboratory column providing about 30 theoretical plates. The narrow cuts were analyzed by a combination of specific gravity, boiling point, refractive index, ultraviolet and infrared techniques.

The feed to this run consisted of: ethylbenzene, 0.81 mol; toluene, 1.86 mols; m-xylene, .81 mol; p-xylene, .83 mol. Substantially anhydrous liquid HF to the amount of 28 mols and $BF_3$ to the amount of 2.60 mols were added to the reactor. The contents of the reactor were agitated for 30 minutes at 54° F. Two phases were found to have been present in the reactor when the contents were withdrawn.

The hydrocarbons in the raffinate and in the extract were analyzed and were found to be as follows:

| Product Distribution, Mols | Raff. | Ext. | Total |
| --- | --- | --- | --- |
| Benzene | 0.08 | 0.11 | .19 |
| Toluene | .89 | .75 | 1.64 |
| m-Xylene | .05 | .88 | .93 |
| p-Xylene | .40 | .29 | .69 |
| Ethylbenzene | .41 | .17 | .58 |
| Ethyltoluene |  | .18 | .18 |
| Diethylbenzene |  | .08 | .08 |

Within experimental error the ethyltoluene and the diethylbenzene were essentially pure meta-isomer. About 25% of the ethylbenzene was converted to ethyltoluene and about 1% to diethylbenzene. This run shows the adverse effect of the presence of a raffinate phase on the degree of conversion to ethyltoluene.

Run 2

In order to determine the effect of a polymethylbenzene complex on the solubility of non-complexible, non-aromatic hydrocarbons in liquid HF, a mixture of mesitylene and n-heptane was treated according to the method described in Run 1. A feed consisting of 3.7 ml. of n-heptane and 171 ml. (1.23 mols) of mesitylene was contacted with 500 ml. (25 mols) of liquid HF and 1.03 mols of $BF_3$ for 45 minutes at 70° F. On the basis that a complex containing equimolar amounts of mesitylene, $BF_3$ and HF existed, there was present in the reactor 0.2 mol (28 ml.) of uncomplexed mesitylene. When the contents of the reactor were withdrawn only a single phase was found to have been present therein. Thus a single liquid phase was formed by treating a feed consisting of 2.1 volume percent of non-aromatic hydrocarbon and the remainder polymethylbenzene with 0.84 mol of BF₃ per mol of polymethylbenzene and sufficient liquid HF to dissolve the feed. The solubility of mesitylene in liquid HF alone is about 3 volume percent. Thus about 15 ml. of mesitylene could be dissolved in the liquid HF in the absence of complex. Therefore about 13 ml. of mesitylene were brought into solution through the solubilizing action of the complex. Heptane is substantially insoluble in liquid HF alone so that virtually the entire amount dissolved in the complex-containing liquid HF is due to the solubilizing action of the complex.

Run 3

In this run the feed and operating conditions were identical with those of Run 2 except that an additional 21 ml. of n-heptane were present. When the contents of the reactor were withdrawn, two phases were found to have been present. The analysis of the extract phase indicated that about 2% of the hydrocarbons therein was n-heptane.

The annexed drawing, which forms a part of this specification, illustrates one embodiment of this invention. The embodiment shown is schematic and many items of process equipment, such as, pumps and valves, have been omitted; these may be readily supplied by those skilled in the art.

The feed to this illustration was derived from a C₈ aromatic cut, boiling between 270° and 300° F., of a hydroformate. This cut contained about 12% of non-aromatic hydrocarbons. The non-aromatic hydrocarbon content was reduced to about 2 volume percent by means of an extractive distillation, with phenol as the separating agent. The C₈ feed consists essentially of 2 volume percent of non-aromatic hydrocarbons which includes a trace of olefins and organic-sulfur compounds (a total sulfur content of about 0.01%), less than 1 mol % of C₉ aromatic hydrocarbons and the remainder C₈ aromatic hydrocarbons. The C₈ aromatic hydrocarbons consist of: ethylbenzene, 12%; o-xylene, 21%; m-xylene, 48%; and p-xylene, 19%.

The C₈ aromatic feed is passed from source 11 by way of lines 12 and 13 into mixer 14. Toluene from source 16 is passed by way of lines 17 and 18 into mixer 14. Substantially anhydrous liquid HF from source 19 is passed by way of valved line 21 and line 22 into mixer 14. In this illustration 9 mols of liquid HF per mol of C₈ feed and diethylbenzene recycle are present in mixer 14. BF₃ from source 23 is passed through valved line 24 and line 26 into mixer 14. In this illustration 1.5 mols of BF₃ per mol of C₈ feed and diethylbenzene recycle are present in mixer 14. In this illustration 3 mols of toluene are used per mol of transferable ethyl groups in mixer 14.

Mixer 14 is provided with heat exchanger 28. The complex formation is exothermic and heat exchanger 28 may be used to either withdraw heat of complexing or to raise the temperature of the materials to the desired reaction temperature. Mixer 14 may be any form of mixing chamber or may be provided with a motor-driven agitator. In mixer 14 the feed is dissolved into the liquid HF either in the form of a complex, or in free solution to form a single homogeneous liquid phase.

The liquid phase and undissolved gaseous BF₃ are passed from mixer 14 by way of line 29 into reactor 31. Reactor 31 is provided with heat exchangers 32 and 33, which heat exchangers maintain the desired contacting temperature in reactor 31. In this illustration the contacting temperature is 90° F. and the contacting time is about 10 minutes. No agitation is needed in reactor 31 as the single homogeneous liquid phase provides more than adequate intimacy of contacting.

At the completion of the reaction time the liquid HF solution is withdrawn from reactor 31 by way of line 34 and is passed into decomposer 36. Decomposer 36 is a vertical vessel provided with an internal heat exchanger 37 and with a few fractionating trays not shown. In decomposer 36 the HF and the BF₃ are removed from the single homogeneous liquid phase and pass out of decomposer 36 by way of line 38. Decomposer 36 should be operated in such a way that the BF₃ and HF are removed at such a rate that substantially no further reaction takes place. Decomposer 36 may be operated at temperatures below the boiling point of liquid HF by the use of a vacuum or may be operated at elevated temperatures, e. g., 150° F. In this illustration decomposer 36 is operated at about 70° F. under a slight vacuum provided by vacuum pump 39.

The HF and BF₃ pass overhead through line 38, vacuum pump 39 and line 41 into heat exchanger 42. In heat exchanger 42 the HF vapors are condensed. The liquid HF, containing some dissolved BF₃ and gaseous BF₃, is passed by way of line 43 into gas separator 44. A liquid HF stream saturated with BF₃ is withdrawn from separator 44 and recycled to mixer 14 by way of line 22.

Gaseous BF₃ is withdrawn from separator 44 and is recycled to mixer 14 by way of line 26. Gradually a build-up in the BF₃ of hydrogen sulfide will occur from decomposition of organic sulfur compounds in decomposer 36. Periodically BF₃ from separator 44 should be withdrawn and passed through a purification zone not shown to remove undesired gases such as H₂S.

When operating with a liquid propane quench in line 34, provision must be made to condense the propane in exchanger 42 and separate the liquid propane from the liquid HF. This may be carried out in a suitable settler-separator 44.

From the bottom of decomposer 36 hydrocarbons are withdrawn and passed by way of line 46 into fractionator 47. Fractionator 47 is provided with an internal heat exchanger 48. In fractionator 47 benzene formed in the ethylbenzene and diethylbenzene conversion is passed overhead to storage not shown through line 49. A bottoms stream is withdrawn from fractionator 47 and is passed by way of line 51 into fractionator 52, which is provided with internal heat exchanger 53.

There is taken overhead from fractionator 52, a toluene stream by way of line 54. This toluene stream is recycled to mixer 14 by way of line 54, valved line 56 and line 18. The bottoms fraction is passed through line 57 into fractionator 58, which is provided with internal heater 59.

There is taken overhead from fractionator 58 by way of line 61 a product xylene fraction which consists essentially of m-xylene, the non-aromatic hydrocarbons present in the feed and about 3 mol per cent of ethylbenzene. Also, this product xylene fraction contains a small amount of organic sulfur compounds which boil in the xylene boiling range. From the bottom of fractionator 58 a bottoms fraction is withdrawn by way of line 62. This bottoms fraction, operating on this type of feed, contains higher boiling alkylbenzenes, small amounts of diethylbenzene, some organic sulfur compounds and ethyltoluene.

The hydrocarbons are introduced from line 62 into fractionator 63, which is provided with internal heater 64. Overhead an essentially pure ethyltoluene fraction is removed and passed to storage not shown by way of line 66. A bottoms fraction consisting essentially of diethylbenzene is recycled from fractionator 63 by way of lines 67 and 13 to mixer 14.

It has been found that ethyltoluene can be reacted with benzene in the presence of liquid HF and BF₃ treating agent to produce an equilibrium mixture consisting essentially of ethylbenzene, ethyltoluene, benzene and toluene. The ethylbenzene may be recovered as essentially pure ethylbenzene by distillation from the product mixture.

The feed stock to the ethyltoluene conversion process should be essentially pure ethyltoluene. In order to maximize the yield of ethylbenzene it is necessary that other aromatic hydrocarbons such as xylene and toluene be absent from feed to the contacting zone.

The amount of benzene present in the feed mixture of ethyltoluene must be at least 1 mol for each mol of ethyltoluene. However, the yield of ethylbenzene is improved by the use of more than the theoretical amount of benzene; as much as 20 mols per mol of ethyltoluene may be used. The preferred usage of benzene is between about 4 and 7 mols per mol of ethyltoluene.

It has been found that substantially no reaction takes place between ethyltoluene and benzene when more than 1 mol of $BF_3$ is present per mol of ethyltoluene. Apparently the reaction does not proceed at an appreciable rate unless some uncomplexed ethyltoluene is present in the complex-containing HF solution. While some reaction will occur at very low $BF_3$ usages such as 0.1 mol per mol of ethyltoluene, the degree of conversion is low and the reaction rate is very slow. It is preferred to operate the ethyltoluene conversion process with between about 0.3 and 0.5 mols of $BF_3$ per mol of ethyltoluene.

Just as in the ethylbenzene conversion process, sufficient liquid HF must be present to participate in the formation of the ethyltoluene complex and also to dissolve said complex. Thus the amount of liquid HF used should be from at least about 2 mols to as much or more than 50 mols per mol of ethyltoluene in the feed to the contacting zone. However, it has been found that the amount of liquid HF does have an effect on the degree of conversion so that it is preferred to operate with a liquid HF usage between about 10 and 25 mols per mol of ethyltoluene in the contacting zone.

It has been found that somewhat elevated temperatures of contacting are desirable, in order to speed up the reaction rate. The maximum temperature of contacting should be below about 200° F. as it has been found that side reactions involving hydrogen transfer occur at temperatures in excess of about 200° F. In order to essentially eliminate undesired side reactions while obtaining reasonable reaction rates, it is preferred to operate at between about 100° and 150° F. It is to be understood that lower temperatures may be used if either degree of conversion is sacrificed or extremely long contacting times are tolerable.

It has been found that by operating for a sufficient time at a particular contacting temperature it is possible to attain an equilibrium condition; the amount of ethyltoluene present in the equilibrium has been found to depend not only on temperature and contacting time, but also on the amount of benzene present in the contacting zone. Examples of suitable contacting times at particular temperatures are: 60° F., about 16 hours; 100° F., about 2 hours; 150° F., 15–30 minutes.

Thus having described the invention, what is claimed is:

1. A process for the preparation of ethyltoluene, which process comprises contacting a feed consisting essentially of at least one xylene isomer, ethylbenzene and toluene with at least 1 mol of $BF_3$ per mol of xylene and with sufficient liquid HF to form an acid phase, at a temperature between about 0° and about 125° F. for a maximum time between about 2 minutes and 50 hours, where the longer maximum times correspond to the lower temperatures, removing HF and $BF_3$ to obtain a mixture of hydrocarbons and separating a product ethyltoluene fraction therefrom and wherein the mol ratio of toluene to ethylbenzene is at least 1 and the mol ratio of xylene to toluene is at least 1.

2. The process of claim 1 wherein the amount of $BF_3$ is at least 1 mol per mol of xylene and at least about 1 mol per mol of ethylbenzene and the amount of liquid HF is at least about 2 mols per mol of xylene and ethylbenzene in the feed.

3. The process of claim 1 wherein the feed contains less than about 2 volume percent of non-complexible, non-aromatic hydrocarbons and a xylene/toluene ratio such that substantially only one liquid phase is present in said contacting zone.

4. A process for the preparation of ethyltoluene, which process comprises contacting a feed comprising essentially at least one xylene isomer, ethylbenzene and toluene, wherein the toluene/ethylbenzene ratio is between at least 1 and 10 and wherein the xylene/toluene ratio is at least about 2, with between about 1 and 5 mols of $BF_3$ per mol of xylene and ethylbenzene in said feed and between about 2 and 50 mols of liquid HF per mol of xylene and ethylbenzene in said feed, at a temperature between about 0° and 125° F. for a maximum time between about 2 minutes and 50 hours, where the longer maximum times correspond to the lower temperatures, removing HF and $BF_3$ from a mixture of hydrocarbons and separating ethyltoluene from said mixture.

5. A process for the preparation of a xylene fraction of low ethylbenzene content and ethyltoluene by contacting a feed consisting essentially of a mixture of ethylbenzene and xylene isomers derived from petroleum fractions and less than about 2 volume percent of non-aromatic hydrocarbons with toluene and between about 1.2 and 3 mols of $BF_3$ per mol of $C_8$ aromatic hydrocarbon, at a temperature between about 70° and 100° F. for a time between about 10 minutes and 30 minutes, where the longer times correspond to the lower temperatures, removing HF and $BF_3$ to recover a mixture of hydrocarbons, comprising ethyltoluene, diethylbenzene, and a xylene fraction which is low in ethylbenzene content and separating essentially pure meta-ethyltoluene and said xylene fraction from said mixture, and wherein the amount of toluene present in said contacting zone is between about 1 mol per mol of ethylbenzene in the feed and the maximum amount soluble in the acid phase.

6. The process of claim 5 wherein diethylbenzene is recovered from said mixture of hydrocarbons and said diethylbenzene is cycled to said contacting zone, and wherein said HF and said $BF_3$ usages are based on $C_8$ aromatic hydrocarbons and diethylbenzene present in the feed, and wherein the amount of toluene is based on the mols of "ethyl groups" present in said feed.

7. A process for the preparation of ethyltoluene, which process comprises contacting a feed comprising essentially ethylbenzene and toluene, wherein the mol ratio of toluene to ethylbenzene is at least 1, with a polymethylbenzene and at least 1 mol of $BF_3$ per mol of said polymethylbenzene and a sufficient amount of liquid HF to form a separate acid phase, at a temperature between about 0° and about 125° F. for a maximum time between about 2 minutes and about 50 hours, where the longer maximum times correspond to the lower temperatures, removing HF and $BF_3$ to obtain a mixture of hydrocarbons containing ethyltoluene and wherein said polymethylbenzene is present in an amount sufficient to solubilize into the acid phase an amount of toluene appreciably in excess of the solubility of toluene in liquid HF.

8. The process of claim 7, wherein said polymethylbenzene is a xylene.

9. The process of claim 7, wherein said polymethylbenzene is mesitylene.

10. The process of claim 7, wherein said polymethylbenzene is hexamethylbenzene.

References Cited in the file of this patent

UNITED STATES PATENTS

| 2,521,444 | Brooke et al. | Sept. 5, 1950 |
| 2,528,893 | Lien et al. | Nov. 7, 1950 |